March 20, 1951
A. THOMAS
2,545,905
PASTER FOR WALLPAPER MACHINES
Filed Aug. 17, 1945
4 Sheets—Sheet 1
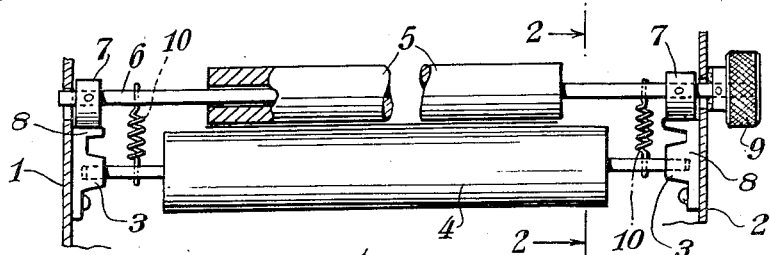
Fig.1.
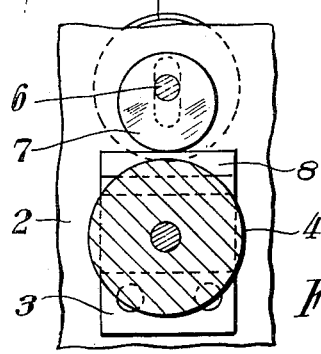
Fig.2.
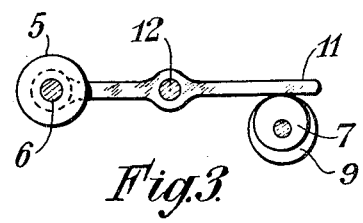
Fig.3.
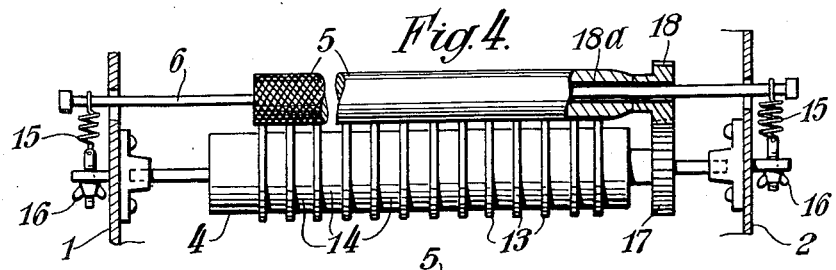
Fig.4.
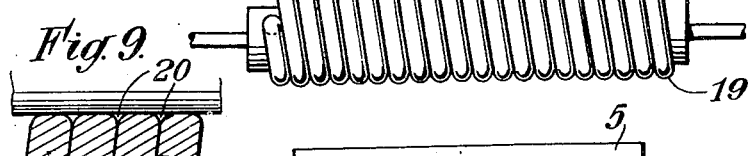
Fig.5.
Fig.6.
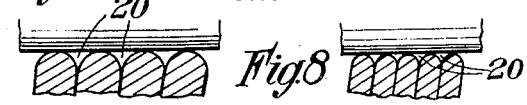
Fig.7.
Fig.8.
INVENTOR:
Alexander Thomas.
Attorney: Walter Gunn March 20, 1951 — A. THOMAS — 2,545,905
PASTER FOR WALLPAPER MACHINES
Filed Aug. 17, 1945 — 4 Sheets-Sheet 2
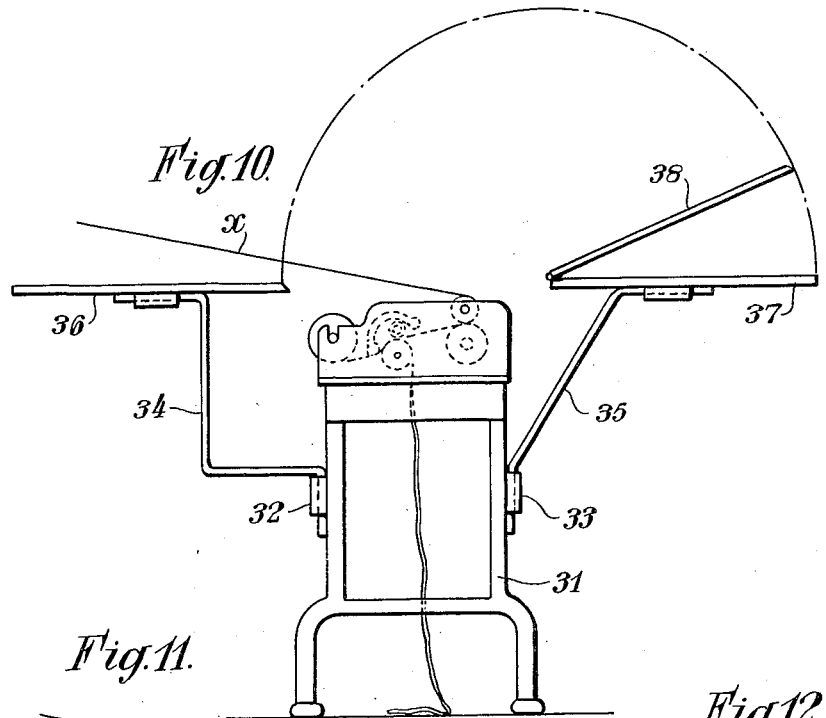
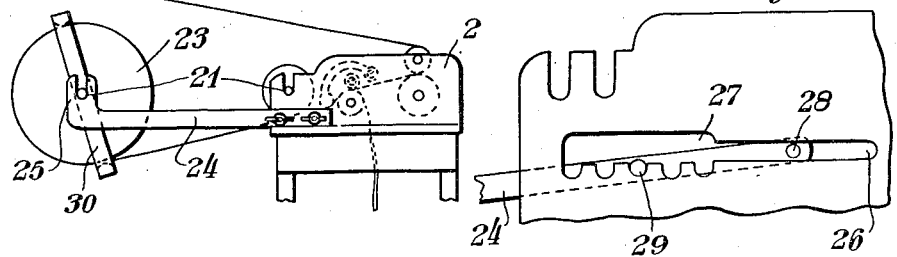
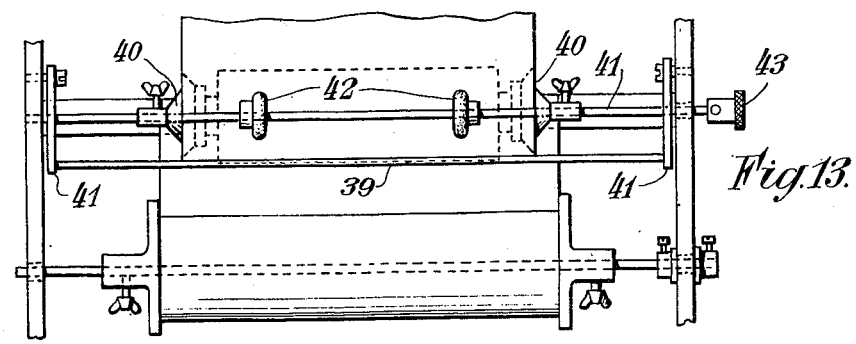
INVENTOR:
Alexander Thomas.
Attorney: Walter Gunn.

March 20, 1951 A. THOMAS 2,545,905
PASTER FOR WALLPAPER MACHINES
Filed Aug. 17, 1945 4 Sheets-Sheet 3

INVENTOR:
Alexander Thomas.
Attorney: Walter Gunn.

March 20, 1951     A. THOMAS     2,545,905
PASTER FOR WALLPAPER MACHINES
Filed Aug. 17, 1945     4 Sheets-Sheet 4
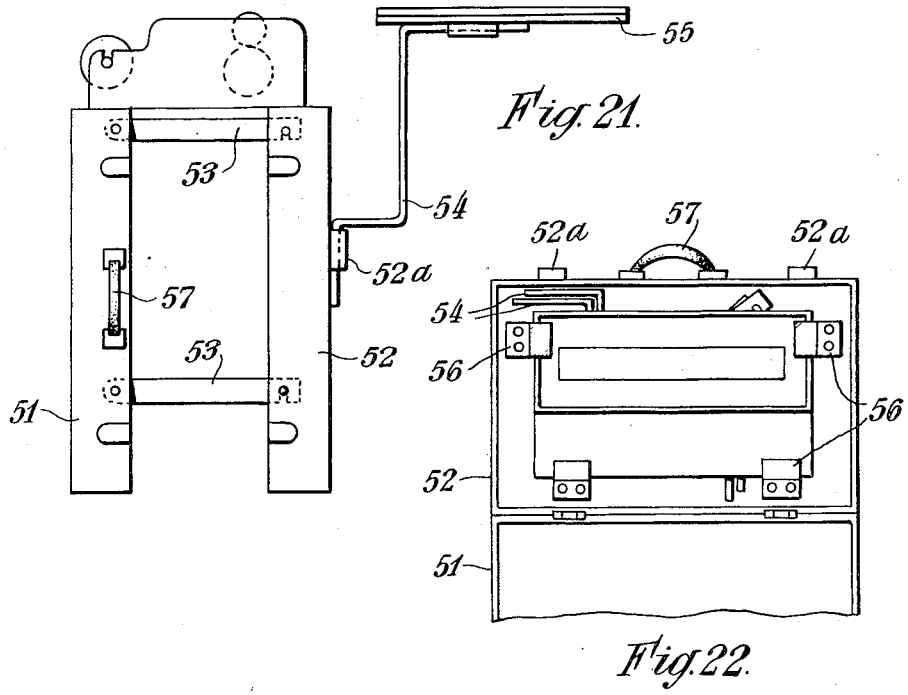
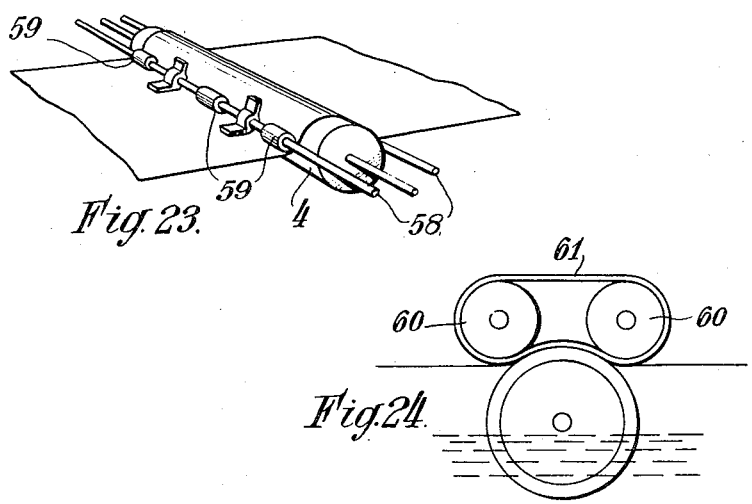
INVENTOR:
Alexander Thomas
Attorney: Walter Gunn Patented Mar. 20, 1951

2,545,905

UNITED STATES PATENT OFFICE 2,545,905

PASTER FOR WALLPAPER MACHINES

Alexander Thomas, Manchester, England, assignor to Hyde Manufacturing Company, Southbridge, Mass.

Application August 17, 1945, Serial No. 610,967
In Great Britain June 17, 1944

Section 1, Public Law 690, August 8, 1946
Patent expires June 17, 1964

2 Claims. (Cl. 91—51)

This invention relates to machines for pasting wallpaper ready for hanging (the term "wallpaper" including ceiling paper, display paper in roll form and the like) with or without means for severing the selvedges from the roll, where these are present in the roll, but are not required in the hung paper.

The invention aims at providing an efficient machine which is readily transportable, being suited inter alia to the jobbing paperhanger who needs to carry his tackle from place to place; which is not unduly large when packed for transport; which is capable of dealing with papers of different thicknesses requiring different quantities of adhesive; and which has means for effecting easy adjustment of the working parts to allow for wear and tear, and to allow the user to obtain reasonably consistent results despite any variations in the stiffness and/or porosity of the papers, and in the viscosity of the adhesive.

The invention is concerned with that type of machine in which there is a frame or stand surmounted by a table and a pasting device, the last-named consists of a paste-box or trough with pasting roller therein, a pressure roller or equivalent means between which and the pasting roller the paper passes whilst being pasted, and a support for the roll of unpasted paper. These several parts are so disposed that the pasted paper passes around the pressure roller and is pulled towards the table with its pasted side uppermost, which arrangement lends itself to the usual custom of preparing a folded pasted length with a long fold at one end, and a shorter fold at the other end. A cutting-off device is provided for severing successive lengths of pasted paper. When it is desired to trim the edges of the paper, say for the removal of selvedges, trimming cutters are mounted on the said pasting device, usually so as to operate before the actual pasting takes place.

Wallpapers are made to a great variety of thicknesses, stiffnesses, and porosity, and many of them are embossed, more or less deeply. In fact, it is a matter of experience that some papers are embossed to a greater degree than is commensurate with their strength. These different grades of paper require different degrees of pasting, some calling for a thicker coating of adhesive than others. Again, these different grades of paper, and especially the embossed papers, result in the rolls of standard yardage having different diameters, some of the embossed papers being in rolls several times the diameter of a roll of thin un-embossed paper.

A pasting machine or trimming and pasting machine, to be universally adaptable should include means for varying the amount of adhesive applied and should include means for receiving rolls of different diameters without the smaller rolls being too far removed from the trimming and paste-applying devices, and, since the machine is to be easily portable, without the supports for the larger rolls increasing the overall dimensions of the machine beyond convenient limits for portability. The machines of the present invention satisfy all these desiderata, and also include other and minor features of improvement applicable to a machine as above defined, which will be made clear in the ensuing more particular description.

Another object of the invention is the provision of an improved wallpaper pasting machine which is provided with a pair of superimposed rollers which yieldingly engage each other and between which the web of paper to be pasted passes, the lower or paste-applying roller having a resilient outer peripheral surface. This resilient structure may comprise a plurality of annular rings carried by the roller, or it may comprise a winding of resilient fibrous material such as cord, or it may be otherwise formed. The pressure which this upper or pressure roller may exert against the lower or paste-applying roller may be varied. Between the rings, or the convolutions in the case of the continuous winding, there are recesses or depressions. Thus, as the pressure is increased the size of the depressions is reduced due to the greater compression of the surface, and less paste is applied to the paper. Less pressure produces a greater deposit of paste.

The various devices and mechanisms of the invention are illustrated in the accompanying drawing, wherein:

Fig. 1 is a side elevation, partly in section, of a pasting device, with one means for varying the gap between the two rollers, to vary the amount of adhesive applied;

Fig. 2 is a cross-section of the same on the line 2—2 of Fig. 1;

Fig. 3 is a side view of an alternative mode of varying the gap;

Fig. 4 is a view similar to Fig. 1, but showing another means for varying the said gap;

Fig. 5 is a side view of the superimposed rollers wherein the lower or paste-applying roller is provided with a winding of resilient cord.

Fig. 6 is similar to Fig. 5, but shows a cord of smaller diameter than that shown in Fig. 5.

Fig. 7 is an enlarged broken section showing the relationship between the cord winding and the pressure roller illustrated in Fig. 5.

Fig. 8 is similar to Fig. 7, but shows the relationship of the cord to the pressure-applying roller illustrated in Fig. 6.

Fig. 9 is an enlarged broken section showing the effect of increased pressure on the cord winding.

Fig. 10 is a side view of a complete machine, with one form of extension table applied thereto;

Fig. 11 is a side view of the pasting portion of the machine of Fig. 10, with one form of extended supports for the roll of paper;

Fig. 12 illustrates a modified arrangement for the extended supports.

Fig. 13 is a plan of a part of the machine shown in Fig. 10;

Figure 17:
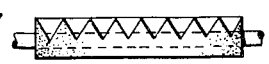
Figure 19:
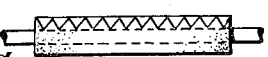
Figures 18, 20:
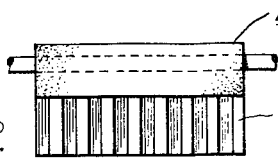

Fig. 17 is a plan view of another form of wiper;
Fig. 18 is a view in elevation thereof;
Fig. 19 illustrates another wiper in plan; and
Fig. 20 is a view in elevation thereof.

Fig. 21 is a side view of a machine having an improved collapsible stand;

Fig. 22 is a view of the same machine packed for transport in a case constituted by the stand; and Fig. 23 is a perspective view of alternative means for applying pressure to the sheet as it passes over the pasting roller;

Fig. 24 is an end view of a further pressure-applying means; and

Figure 25:
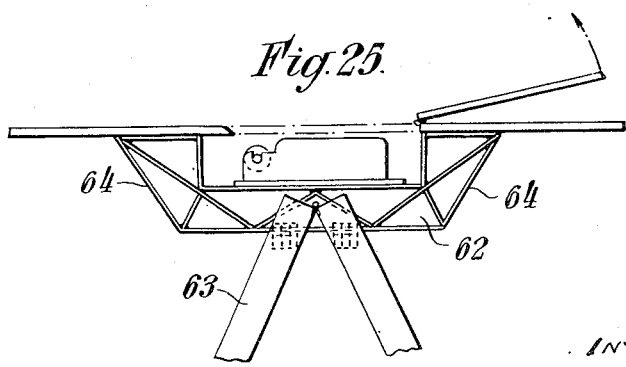

Fig. 25 shows an improved construction of stand for the pasting table.

Referring first to Figs. 1 to 9 and 11 and 12, the wallpaper pasting machine shown is of the kind referred to, but in accordance with the invention has means for providing a gap of variable width between the paste-applying roller and the pressure roller or other pressure member or members, the variation being from nil to a predetermined maximum, and has means for varying the horizontal distance between those rollers and the support for the roll of unpasted paper.

The end walls of the paste trough are indicated at 1 and 2, each wall carrying on its inner face a bearing block 3, in which is journalled the paste-applying roller 4. The lower part of this roller, is use, lies in the adhesive, as will be understood from Figs. 15 and 16. Above the pasting roller 4, but shorter in length, is the so-called pressure roller 5, which is loosely mounted on shaft 6, the shaft being supported by eccentrics or cams 7 on the lugs 8 of the bearing blocks 3. The shaft 6 continues through the walls 1, 2, these being slotted to allow it to rise and fall, and at one end is fitted with a knob 9 by which it and the cams may be rotated. As will appear more clearly from Fig. 2, rotation of the cams causes the shaft to rise and fall in the slots, whereby the gap between the rollers 4 and 5 may be varied. Springs 10 may be provided to urge the shaft 6 towards the roller 4. The roller 5 may be plain surfaced as shown, or may be grooved, ribbed or knurled or otherwise formed. Instead of the roller 5 being shorter in length than the pasting roll 4, it may be of reduced diameter at the ends.

In the modification of Fig. 3, instead of cams having a direct lift on the pressure roller, a lever 11 is introduced at each end of the trough, pivoted at 12, and carrying the pressure roller at one end whilst the cams 7 operate on the other end. This construction allows of removal and replacement of the pressure roller with less liability of upsetting the adjustment of the cams, and also allows of a more accurate adjustment.

Referring next to Fig. 4, instead of the pasting roller 4 having a smooth surface, it is provided with resilient members 13, leaving spaces 14 between them, and instead of the roller 5 being supported on rigid supports as in Figs. 1 and 3, it is urged against the resilient members 13 by means of the tension springs 15 and adjusting nuts 16. The degree of compression of members 13 and therefore the cross-section of the spaces 14 at the nip (upon which depends the amount of paste applied) is variable by variation of the tension in the springs 15. In this figure also, the pressure roller 5 is shown geared to the shaft of the pasting roller 4, by means of the toothed wheels 17 and 18. These are formed with a pre-determined chordal thickness on the pitch line, to allow for varying mesh as the gears are moved towards or away from each other, and so that there is merely an increased back-lash at the maximum distance apart. This gearing may be adopted in the arrangement of Fig. 1 also. The roller 5 and wheel 18 are mounted on a hollow sleeve 18a which is freely rotatable on shaft 6.

The said gap at the pasting nip may be a single continuous gap, with parallel sides, as when two plain-surfaced rollers are employed, as in Fig. 1, or may be a series of interrupted gaps, as in Figs. 4 to 9. To achieve this latter alternative, the invention may be characterised by the provision of an uneven resilient surface on the paste-applying roller, having a number of depressions or recesses in its surface to carry the paste, and by the provision of adjustable spring or like means for varying the pressure between the two rollers to vary the degree of compression of the resilient protuberances which separate the said depressions. It has been found that, the greater the pressure, and therefore the smaller the depressions due to the greater compression of the surface, the less is the amount of paste applied to the paper, and vice versa.

One convenient mode of obtaining the resilient uneven surface, is by winding the paste-applying roller with a resilient cord, or by placing on the roller a number of side-by-side resilient rings. By selecting a suitable diameter of cord, the maximum size of the space between the successive coils may be determined.

Figs. 5 to 9 illustrate the use of a spirally-wound resilient member 19, of circular section at the outer face. A resilient cord is useful for this purpose. By comparing Figs. 5 and 6, or Figs. 7 and 8, it will be seen that the cord of larger diameter leaves fewer but larger spaces 20 at the nip, but these are found to give a heavier coating to the paper. As the springs 15 are tensioned, and compression takes place, the ridges of the cord tend to flatten, as shown in Fig. 9, leaving the spaces 20 much smaller.

The means for varying the distance between the pasting devices and the support for the unpasted roll may take several forms. Conveniently, the frame of the machine has one or more supporting positions for the roll, and there are movable extension pieces on the frame, formed with one or more supporting positions, which may extend beyond the frame, for the large-diameter rolls, and which may be removed or retracted when it is desired to pack the frame away in its case. The said extensions may be hingedly or slidably mounted, or may be completely detachable, and the degree of extension may vary. Locking means to hold them in the extended position may be provided.

Figures 11 and 12 illustrate two modes of extending the supports for the roll of unpasted paper. In Fig. 11, the side walls 1 and 2 of the paste box (one wall only is shown) each have an open-topped slot to hold the supporting axle 21 for the roll of paper. When a large roll such as that indicated at 23 is to be supported, there is no room in the machine, and the extension arms 24 are bolted to the side walls 1 and 2, these arms having upturned slotted ends 25 to receive the axle 21. In Fig. 12 the side walls 1 and 2 have openings or slots which include a straight part 26 and a notched part 27, whilst the arms 24 carry pins 28 and 29 to lie respectively in the straight and notched parts of the slot. By raising the outer ends of the arms 24 until the pins 29 leave the notches, the bars may be slid inwards or outwards and the pins 29 then dropped into an alternative notch. This arrangement allows of the positioning of the axle 21 according to the diameter of the roll which it carries.

To accommodate the extra large rolls of paper, and maintain an even feed to the edge trimming means, sufficiently large end plates or guides 30 are provided on the axle 21, and these have all edges well rounded or chamfered, where contact with the edge of the paper is likely to occur.

According to another feature of this invention, the machine comprises a collapsible or foldable frame, a main table or platform at one part of the frame and the improved pasting device at another part of the frame, and is characterised by an extension table, adapted to be moved into the plane of the main table as an extension thereof, to cover the gap between the main table and the pasting device and/or to cover the pasting device, or to be moved away to a position out of the region of normal use of the main table and pasting device.

Referring to Figs. 10 and 25, the pasting device is mounted on a stand 31. This stand has lugs or brackets 32, 33, to receive the cranked bars 34, 35 for supporting a table. The bars 34 support a main table 36, which is normally used during pasting, the paper x being drawn from the machine on to this table with its pasted side uppermost. Carried by the bars 35 is an extension table having a fixed leaf 37 and a hinged leaf 38, which latter may lie on the fixed leaf 37, or may be swung over to the position shown in broken lines, to cover the pasting device. This extension table, when opened out to form a continuous table with the part 36, provides a convenient surface for the carrying-out of several minor operations, such as the hand-pasting of cut borders, or the marking of strips for cutting with shears, say to fit a fireplace surround. Other constructions of extension table may be adopted in place of the hinged flap shown. For instance, a slidable leaf may be provided in place of the hinged leaf.

When edge-trimming devices are employed, and the paper to be trimmed is thick, especially when it is embossed, the improved machines may be further characterised in that means is provided for spreading or smoothing out the paper just prior to its approach to the trimming cutters, and further means is provided for the manual operation of the cutters to facilitate the initial feeding of the paper through them.

Reference should now be had to Fig. 13, which shows the use of a smoothing member 39 to lie on the paper as it approaches the edge-trimming cutters 40. In the form shown, this smoothing member is a rod, carried in the curved pivoted brackets 41, by which it may be swung clear of the cutters when not required. The bar 39 lies on the patterned side of the paper and is especially useful in the case of an embossed paper.

In order to assist in the initial feeding of the thick paper to and between the edge-trimming cutters 40, means is provided for manual operation of those cutters. The upper cutter of each pair is carried on a spindle 41, which also carries rubber-tired discs 42 bearing on the paper over a supporting roll (not shown) the friction of the paper on those discs driving the cutters, and such spindle 41 extends through one of the side walls of the machine, where it is fitted with a knurled knob 43 for manual operation. The upper and lower cutters may be geared together, if desired, so that the manual operation will influence both of them, and the usual spring means will be applied to urge the rotary blades against each other.

Figure 14:
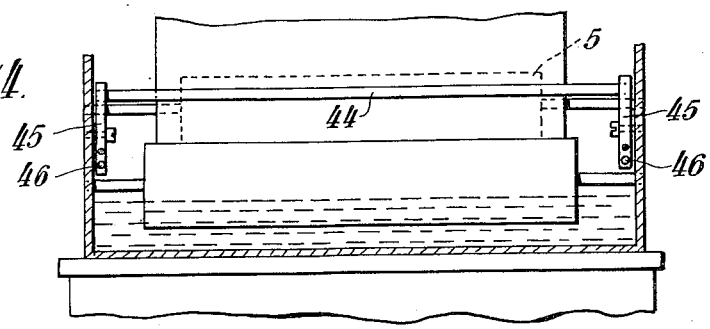
Fig. 14 is a sectional end view of the pasting devices shown in Figs. 11 and 13.
Figure 15:
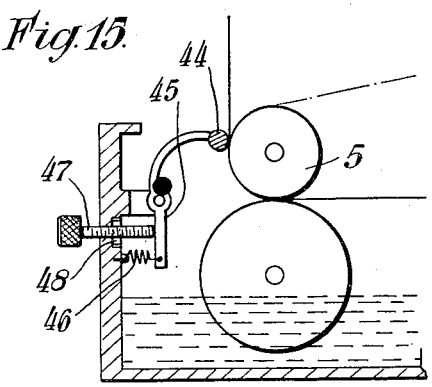
Fig. 15 is a transverse section of the pasting device showing one form of spreading means for the paste.
Figure 16:
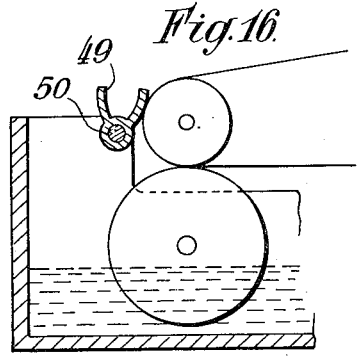
Fig. 16 is a transverse section of the pasting device showing a form of flexible squeegee wiping device.

Referring next to Figs. 14 and 15, there is shown in the pasting box, a rod 44 extending across the machine and held in pivoted levers or fingers 45. Springs 46 urge the rod 44 against the pasted surface of the paper, as it passes around the upper roller 5, causing the rod to remove from the paper any lumps or excess thickness of paste which may be on the paper. Other spreading and scraping means than a rod may be employed, for example a rubber or like strip, or a brush. Passing through the adjacent wall of the paste box is a push rod 47 by which the rod 44 may be retracted from the paper, against the tension of the springs 46. Such rod carries a short pin 48, which, when moved out of the wall and the push rod is given a part rotation holds the push rod and therefore the rod 44 in the retracted position. For removing excess paste from the margins of the paper, Fig. 16 shows the use of short flexible squeegee members 49, of rubber or the like, these being carried on a rod 50. Figs. 17 to 20 show two such squeegees, one having coarser ribs than the other. Each has a body or hub part 49a, hollow to fit on the rod 50 tightly, and a ribbed vane part 49b.

A pasting machine characterised as above, is more efficient if the pressure roller (at least for its effective diameter) is shorter than the width of the paper, so that it does not pick up paste at its ends, and, where a large width of gap is to be used at the nip, for heavy pasting, a better result is obtained if a brush or like spreader is provided, after the pasting roller, and if resilient wipers or squeegees are provided to wipe excess paste away from the edges of the paper.

Referring now to Fig. 21, the pasting box is mounted on a stand formed by the box and lid in which it may be packed, as in Fig. 22. The box 51 has a hinged lid 52, and spacing bars 53 are provided to hold the lid at the correct open position for use as a stand. The lid has sockets 52a and carries the brackets 54 for a table 55, whilst a similar table may be attached to the box, and one of them may have a hinged extension corresponding to the flap 38 of Fig. 10. As shown more clearly in Fig. 22, the box has brackets 56 to position the pasting box (after draining it) whilst the spacing bars 53 and Z brackets 54 may be packed below it. The box and lid close up like a suit-case, a handle 57 being provided.

In Figs. 23 and 24, the pressure roller 5 is replaced by the shafts 58 and wipers 59 (Fig. 23) or the rollers 60 and endless band 61 (Fig. 24). The shafts 58, and the rollers 60 will be mounted for adjustment towards and away from the pasting roller 4, similarly to shaft 6 of roller 5, in Figs. 1, 2 and 3.

Fig. 25 shows a cross-braced girder-like support for the tables. This has the horizontal portion 62, fitting sockets on the inverted V stand 63 (which may be a box and lid) and the upstanding end portions 64 to support the tables.

I claim:

1. In a wallpaper pasting machine, the combination of a frame, a paste trough carried by the frame, a pasting roller and a pressure roller journalled in the frame in superimposed relationship and arranged to receive the wallpaper strip therebetween, spring means associated with one of the rollers for causing such roller to apply pressure against the second roller, means for varying the pressure applied by such spring means, and means whereby an increase of pressure causes a reduction in the paste deposit on the paper, such means comprising a helical winding on the pasting roller and formed of a resilient cord which is generally circular when free of pressure, thus leaving paste-carrying cavities between the convolutions whereby the increase in pressure will tend to flatten the winding and reduce the cavities between adjacent turns of the winding.

2. In a wallpaper pasting machine, the combination of a frame, a paste trough carried by the frame, a pasting roller and a pressure roller journalled in the frame in superimposed relationship and arranged to receive the wallpaper strip therebetween, the axis of the upper pressure roller being movable toward and away from the pasting roller, spring means for urging the pressure roller against the pasting roller, means for varying the spring pressure, and means whereby an increase in pressure causes a reduction in the paste deposit on the paper, such means comprising a helical winding on the pasting roller and formed of a resilient cord which is generally circular when free of pressure, thus leaving paste-carrying cavities between the turns of the winding, whereby the increase in pressure will reduce the cavities between adjacent turns.

ALEXANDER THOMAS.

REFERENCES CITED

The following references are of record in the file of this patent:

UNITED STATES PATENTS

| Number | Name | Date |
|---|---|---|
| 632,059 | McCreery | Aug. 29, 1899 |
| 951,425 | Minahan | Mar. 8, 1910 |
| 951,562 | Hamelstrom | Mar. 8, 1910 |
| 1,065,755 | Williams | June 24, 1913 |
| 2,429,670 | Crews | Oct. 28, 1947 |

FOREIGN PATENTS

| Number | Country | Date |
|---|---|---|
| 230,280 | Great Britain | Mar. 12, 1925 |
| 257,432 | Great Britain | Sept. 2, 1926 |
| 603,149 | Great Britain | June 10, 1948 |